United States Patent [19]

Yano et al.

[11] Patent Number: 4,595,854
[45] Date of Patent: Jun. 17, 1986

[54] DRIVE CIRCUIT FOR PIEZOELECTRIC STACK

[75] Inventors: Takeshi Yano; Shinichi Hori; Izumu Fukui; Eiichi Sato; Osamu Inui, all of Tokyo, Japan

[73] Assignee: NEC Corporation, Tokyo, Japan

[21] Appl. No.: 603,816

[22] Filed: Apr. 25, 1984

[30] Foreign Application Priority Data

Apr. 25, 1983 [JP] Japan .................................. 58-72372

[51] Int. Cl.$^4$ ........................................... H01L 41/08
[52] U.S. Cl. ..................................... 310/317; 310/328
[58] Field of Search ............... 310/317, 319, 316, 326, 310/328, 330, 331, 332; 346/140 R, 75; 318/116, 118

[56] References Cited

U.S. PATENT DOCUMENTS

| | | | |
|---|---|---|---|
| 3,371,233 | 2/1968 | Cook | 310/317 |
| 3,649,857 | 3/1972 | Knappe | 310/328 X |
| 3,683,212 | 8/1972 | Zoltan | 310/317 X |
| 4,126,867 | 11/1978 | Stevenson, Jr. | 310/317 X |
| 4,161,670 | 7/1979 | Kern | 310/317 |
| 4,176,976 | 12/1979 | Lendl | 310/328 X |
| 4,193,703 | 3/1980 | Sakmann | 310/328 X |
| 4,435,666 | 3/1984 | Fukui et al. | 310/328 |

Primary Examiner—Mark O. Budd
Attorney, Agent, or Firm—Sughrue, Mion, Zinn, Macpeak and Seas

[57] ABSTRACT

A drive circuit for a piezoelectric stack which drives a desired mechanical object such as a printing head of a dot matrix printer or an ink jet printer. A winding is connected in series with one of electrodes of the piezoelectric stack so that an excitation voltage is applied to the stack via the winding. An excessive charge current at each time of drive and an excessive discharge current at each time of recovery are prevented.

19 Claims, 6 Drawing Figures

DRIVE CIRCUIT FOR PIEZOELECTRIC STACK

BACKGROUND OF THE INVENTION

The present invention relates to a circuit for driving a piezoelectric stack.

In a dot matrix printer or an ink jet printer, the printing head is often driven by a piezoelectric actuator which uses a piezoelectric stack. Piezoelectric actuators heretofore proposed for such an application may be exemplified by one designed for an oscillating drive mechanism as disclosed in U.S. Pat. No. 3,614,486. The disclosed type of piezoelectric actuator is constructed such that a piezoelectric stack develops a dimensional strain therein when applied with a voltage and the strain is imparted to a wire, ink drop producing mechanism or like reciprocating mechanical object to print out desired data. The dimensional strain caused by the application of a DC excitation voltage to the piezoelectric stack is turned into oscillation whose amplitude varies in a sinusoidal waveform in terms of time. An ordinary printing head is so constructed as to print out a single dot at each time of drive and such has to be implemented by a piezoelectric stack drive circuit which is capable of causing one period of sinusoidal oscillation every time an excitation voltage is applied.

A prior art drive circuit elaborated for the above purpose comprises, as will be described later in detail, a piezoelectric stack, a power source for applying an excitation voltage to the stack, and a resistor for limiting a rush current in the event of driving the stack. The problem with such a drive circuit is that the drive circuit tends to be damaged because it is charged instantaneously. Another problem is that after the drive the charge stored in the piezoelectric stack needs be dissipated or discharged by short-circuiting, resulting in waste of power.

Meanwhile, U.S. Pat. No. 3,975,650 teaches a drive circuit in which an inductance is connected in series with a piezoelectric stack in order to suppress an instantaneous current that flows through the stack. This circuit, however, lacks the construction for dissipating the stored charge after the drive and, for this reason, it is inapplicable to a wire dot matrix printer head without noticeably lowering the quality of printed characters.

SUMMARY OF THE INVENTION

It is therefore an object of the present invention to provide a drive circuit for a piezoelectric stack which solves the problems discussed above and operates with a minimum of power consumption while insuring excellent printing quality.

It is another object of the present invention to provide a generally improved drive circuit for a piezoelectric stack.

In one aspect of the present invention, there is provided a drive circuit for a piezoelectric stack which comprises a piezoelectric stack connected to a reciprocating mechanical object and generating a dimensional strain in response to an excitation voltage applied across electrodes of the piezoelectric stack to drive the object in a reciprocating motion, a winding connected in series with one of the electrodes of the piezoelectric stack, a switch circuit for applying the excitation voltage to the piezoelectric stack via the winding in response to a drive signal which is representative of an application timing of the excitation voltage, and a feedback element connected in parallel to the switch circuit.

In another aspect of the present invention, there is provided a drive circuit for a piezoelectric stack which comprises a piezoelectric stack connected to a reciprocating mechanical object and generating a dimensional strain in response to an excitation voltage applied across electrodes of the piezoelectric stack to drive the object in a reciprocating motion, a winding connected in series with one of the electrodes of the piezoelectric stack, a first switch circuit for applying the excitation voltage to the piezoelectric stack via the winding in response to a drive signal which is representative of an application timing of the excitation voltage, a first feedback element connected in parallel to the first switch circuit, a second switch circuit for dissipating a charge stored in the piezoelectric stack via the winding in response to a damp signal which is representative of a damping timing for the dimensional strain, and a second feedback element connected in parallel to the second switch circuit.

The above and other objects, features and advantages of the present invention will become apparent from the following detailed description taken with the accompanying drawings.

DESCRIPTION OF THE PREFERRED EMBODIMENTS

While the drive circuit for a piezoelectric stack of the present invention is susceptible of numerous physical embodiments, depending upon the environment and requirements of use, substantial numbers of the herein shown and described embodiments have been made, tested and used, and all have performed in an eminently satisfactory manner.

To facilitate understanding of the present invention, a brief reference will be made to a prior art drive circuit for a piezoelectric stack, shown in FIGS. 1 and 2.

Figure 1:
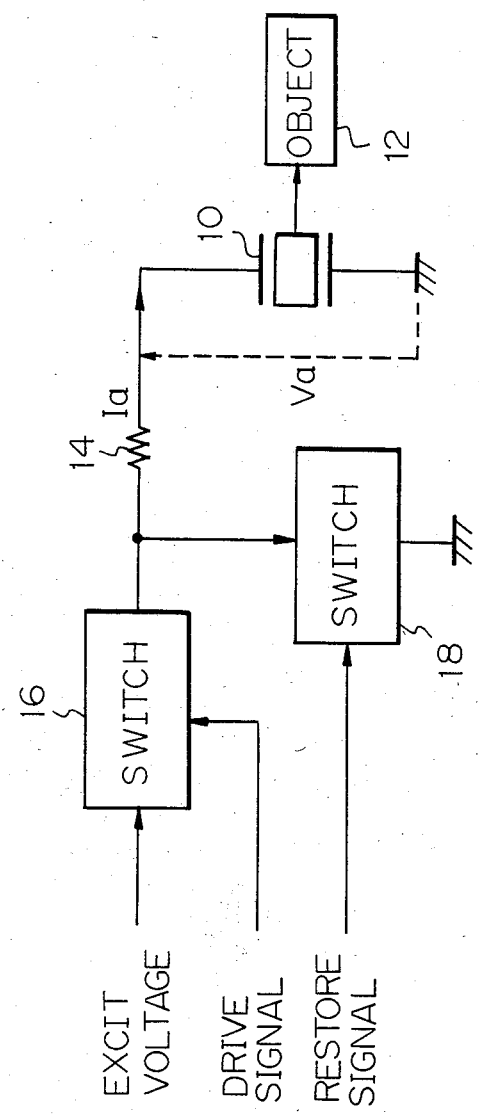
FIGS. 1 and 2 are respectively a block diagram and a timing chart which individually represent a prior art drive circuit for a piezoelectric stack.
Figure 2:
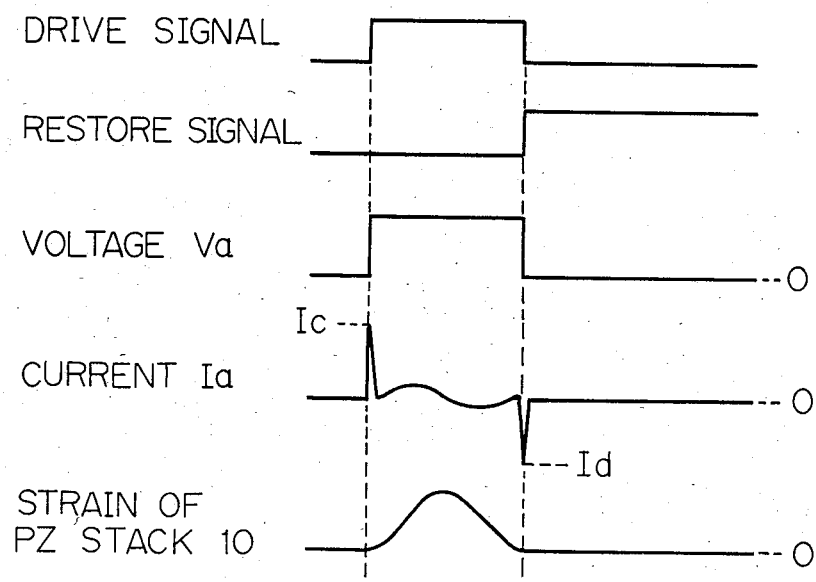

Referring to FIGS. 1 and 2, a piezoelectric (PZ) stack 10 serves as a piezoelectric actuator which develops a dimensional strain when applied with a DC excitation voltage and, thereby, causes a printing head of a printer or like mechanical object 12 into oscillation. One electrode of the PZ stack 10 is connected to switches 16 and 18 via a resistor 14, while the other electrode is connected to ground. Comprising a transistor, the switch 16 functions to feed an excitation voltage to the PZ stack 10 via the resistor 14 only for the duration of a voltage pulse of a drive signal. That is, a voltage Va across the electrodes of the PZ stack 10 builds up while the drive signal remains high level. In response to the voltage Va, a current Ia flows through the PZ stack 10 which appears as an impulse-like charge current Ic at the buildup of the voltage Va and, then, as a current having a sinusoidal waveform whose period is identical with the oscillation period of the dimensional strain of the PZ stack 10.

Also comprising a transistor, the switch 18 short-circuits the electrodes of the PZ stack 10 via the resistor 14 only for the duration of a voltage pulse of a restore signal. The pulse width of the drive signal is preselected to be equal to one period of the mechanical resonance determined by the PZ stack 10 and a mechanical object 12. Therefore, immediately after the strain of the PZ stack 10 has oscillated just for one period within the duration of a voltage pulse of the drive signal, the electrodes of the PZ stack 10 are short-circuited via the resistor 14 so that the current Ia returns to zero after reaching a discharge current Id which is opposite in direction to the charge current Ic.

In the manner described, the prior art drive circuit is constructed such that the PZ stack 10 is instantaneously charged once for each drive, that is, every time the drive signal builds up, and then the electrodes of the PZ stack 10 are short-circuited to discharge the PZ stack 10 when the amplitude of oscillation of the dimensional strain has returned to zero. Since the charge current at the time of a drive and the discharge current Id at the time of a recovery are substantial, such as 5–10 amperes, they damage or, if not damage, shorten the service life of the switches 16 and 18. Also, a sufficient current capacity is unachievable without rendering the switches 16 and 18 bulky, thereby obstructing a small-size design of a printer. Furthermore, since the charge stored in the PZ stack 10 is dissipated by short-circuiting at each time of drive, power is wasted.

Figure 3:
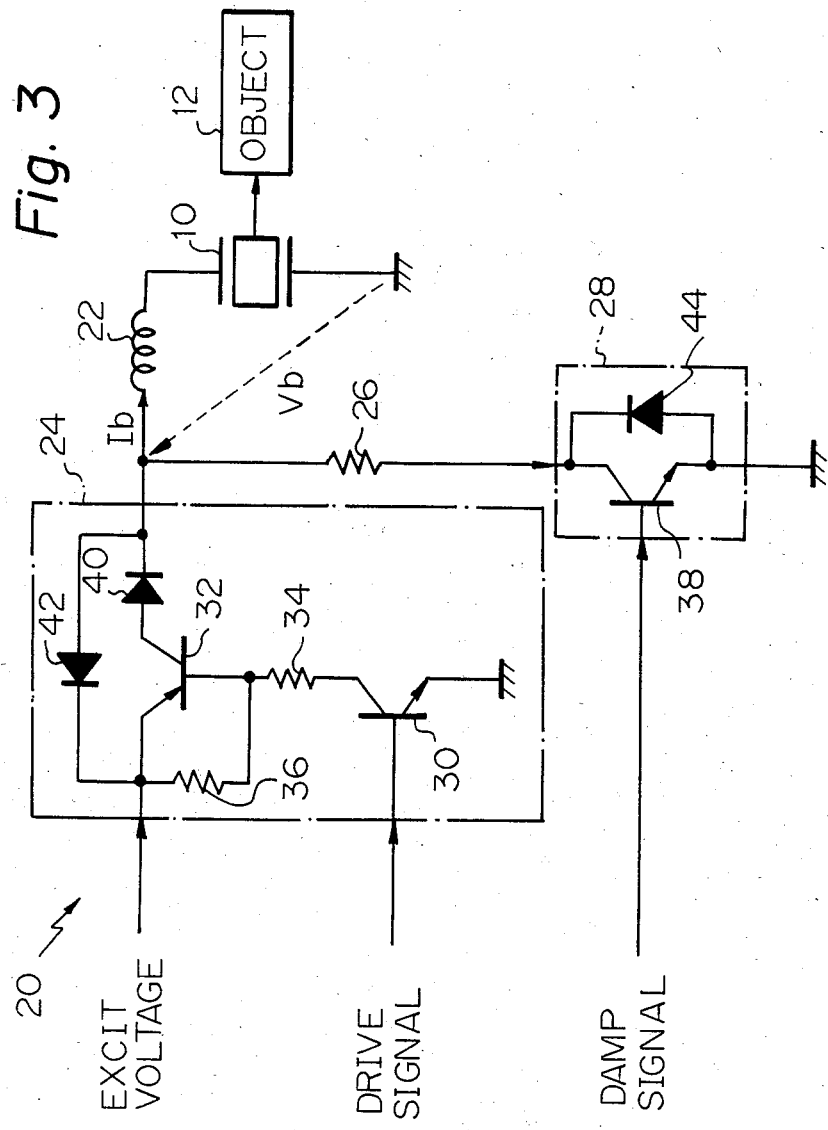
FIGS. 3 and 4 are respectively a circuit diagram and a timing chart individually representative of a drive circuit for a piezoelectric stack embodying the present invention.

A drive circuit for a PZ stack embodying the present invention is shown in a block diagram in FIG. 3 and generally designated by the reference numeral 20. The operation of the drive circuit 20 is represented by a timing chart shown in FIG. 4.

In the drive circuit 20, the PZ stack 10 is a piezoelectric actuator connected to the oscillating mechanical object 12. One electrode of the PZ stack 10 is connected to a switching circuit 24 via a winding 22 and to a switching circuit 28 via a resistor 26, while the other electrode is connected to ground. The switching circuit 24 functions to apply an excitation voltage to the PZ stack 10 via the winding 22 only for the duration of a voltage pulse of a drive signal. In detail, while the drive signal applied to the base of a transistor 30 in the switching circuit 24 is low level, the collector and emitter of the transistor 30 remain cut off from each other so that hardly any base current is allowed to flow through a transistor 32 to keep the collector and emitter of the transistor 32 cut off from each other. In this condition, a voltage Vb at the output terminal of the switching circuit 24 is zero. Connected between the collector of the transistor 30 and the base of the transistor 32 is a resistor 34, and connected between the emitter and the base of the transistor 32 is a resistor 36.

When the drive signal has built up to produce a voltage pulse, the collector and emitter of the transistor 30 are rendered conductive to allow a base current to flow through the transistor 32 and, thereby, renders the collector and emitter of the transistor 32 conductive. Then, the voltage Vb is raised to a level substantially equal to the excitation voltage. Due to the winding connected in series with the PZ stack 10, the current Ib which flows through the PZ stack 10 via the winding 22 within the duration of the high level of the voltage Vb has a sinusoidal waveform only. The pulse width of the drive signal is preselected to be identical with one period of the mechanical resonance determined by the PZ stack 10 and object 12. Therefore, the strain of the PZ stack 10 undergoes just one period of oscillation for the duration of a voltage pulse of the drive signal is high level, the voltage Vb dropping to zero immediately thereafter. That is, since the high level of the voltage Vb is predetermined to last until the current Ib increases from negative to zero, the charge stored in the PZ stack 10 becomes substantially zero when the voltage Vb drops. In this construction, so long as the period of oscillation of the dimensional strain of the PZ stack remains constant at all the times of drive, it is needless to discharge the PZ stack 10 at each time of drive and, hence, the damping means shown in FIG. 3, i.e. winding 22, resistor 26 and switching circuit 28, is omissible.

Meanwhile, where the oscillation period of the dimensional strain of the PZ stack 10 differs from one drive to another such as when the magnitude of a reaction exerted by the mechanism 12, e.g. wire or ink drop producing mechanism, differs from one drive to another, the charge stored in the PZ stack 10 will not always be reduced to zero at every time of drive resulting in accumulation of residual charges. In the circuitry shown in FIG. 3, prevention of such residual charges is implemented by the damping means which is made up of the winding 22 and resistor 26 and switching circuit 28.

The damping means also operates to stop the movement of the object 12 as soon as possible to prevent the residual movement of the object 12 from lowering quality of printed characters. This is achieved by dissipation of mechanical energy stored in the object 12. In detail, an equivalent capacitor of the PZ element restrains the energy conversion rate from mechanical energy to electrical energy. When a resistor is connected to the PZ element without any winding to dissipate the electrical energy converted from the mechanical energy, the resistor dissipates little electrical energy because all of the electrical energy is almost stored in the capacitor. The winding 22 of the damping means functions to increase the electrical energy dissipated through the resistor by adding the inductive reactance of the winding 22 to the capacitive reactance of the capacitor.

When a damp signal which builds up to a high level immediately after a fall of the drive signal is applied to the base of a transistor 38 in the switching circuit 28, the collector and emitter of the transistor 38 are rendered conductive causing one end of the resistor 26 into connection with ground. This completes a serial closed path made up of the winding 22 and resistor 26 through which any residual charge in the PZ stack 10 is dissipated.

An AC current flows into the switching circuit 24 (or 28). To accommodate such that current, the switching circuit 24 (or 28) is furnished with a diode 40 for intercepting a current directed reversely to the transistor 32 and a diode 42 (or 44) constituting a feedback element for bypassing the reverse current.

As described above, applying an excitation voltage to the PZ stack 10 by way of the winding 22 is effective to eliminate excessive charge and discharge currents particular to the prior art circuit to thereby cut down the dimensions of the switching circuits 24 and 28. Now, the inductance of the coil 22 and the pulse width of the drive signal associated therewith are selected by the following procedure.

Figure 4:
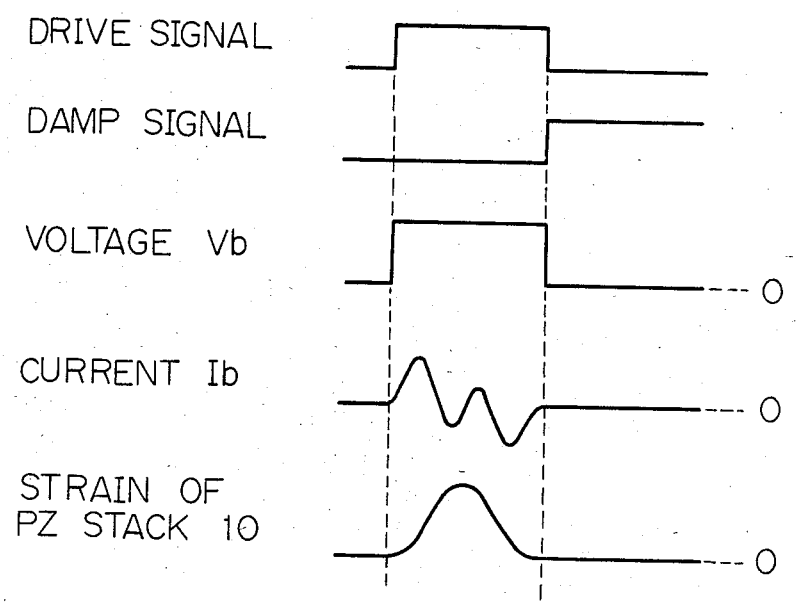

The object 12 forms a mechanical resonant system together with the PZ stack 10. After turning on the switching circuit 24, the strain of the PZ stack 10 begins to increase from zero, then reaches maximum value and again returns to zero. If the switching circuit 24 keeps the on-state, the strain of the PZ stack 10 reaches the maximum value again. Since the object 12 actuated by the stack 10, the residual movement of the object 12 is quickly stopped if the switching circuit 24 is turned off at the minimum value of the strain as shown in FIG. 4.

The period of the current Ib having the sinusoidal waveform is determined by the values of the inductance and the equivalent capacitance. In FIG. 4, the least power consumption is accomplished by turning off the switching circuit 24 when the current Ib charges from the negative to the positive. This means that when the current Ib is fed back from the PZ stack to the power source, the power source is disconnected from the PZ stack 10. On the other hand, the most power consumption is achieved by turning off the switching circuit 24 when the current Ib transits from the positive to the negative. The least power consumption is desirable in practical use. It should be noted that though FIG. 4 shows that two cycles of the current Ib used until the strain becomes the least value, one cycle or more than two cycles of the current Ib may be used.

Figure 5:
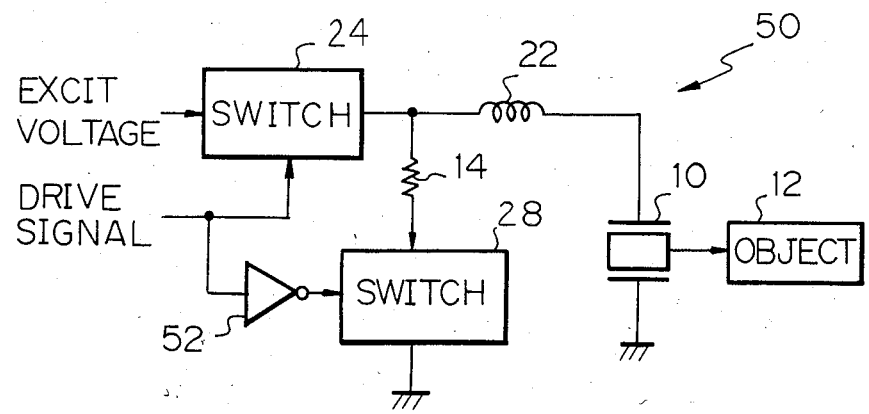
FIG. 5 is a block diagram of another embodiment of the present invention.

Referring to FIG. 5, another embodiment of the present invention is shown. In FIG. 5, the same or similar structural elements as those shown in FIGS. 1 and 3 are designated by like reference numerals. The drive circuit, generally 50, employs as the damp signal shown in FIG. 1 a signal which is developed by inverting the high and low levels of the drive signal by means of an inverter 52. The damp signal output from the inverter 52 is routed to the switching circuit 28. Alternatively, the damp signal may be fed to the switching circuit 24 via an inverter in order to prepare the drive signal shown in FIG. 3. In any case, the timings for applying the excitation voltage and damping the residual oscillation are attainable with ease.

Figure 6:
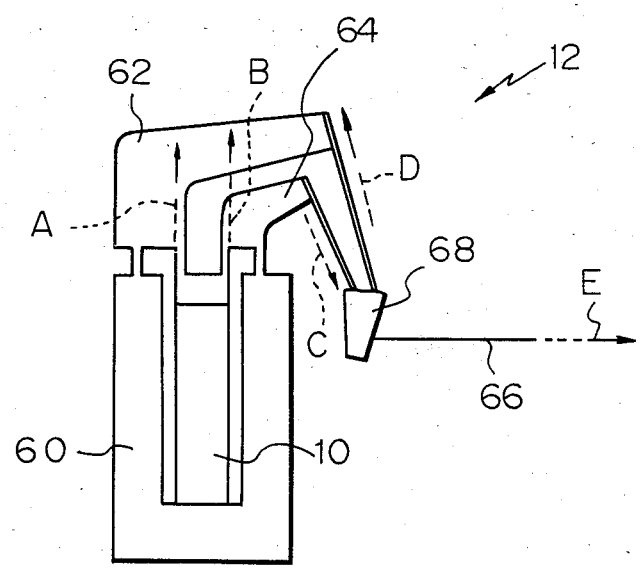
FIG. 6 is a side elevation of an exemplary construction of a mechanism which forms part of each of the embodiments of the present invention.

Referring to FIG. 6, a practical example of the mechanism 12 shown and described in relation with the first and second embodiments is shown in a side elevation. The mechanism 12 in FIG. 6 is an impact printing unit. The PZ stack 10 is rigidly mounted at one end on a mounting section 60 of the unit 12. When applied with an excitation voltage, the PZ stack 10 develops a dimensional strain as indicated by dotted arrows A and B due to the piezoelectric stiffened effect. The strain is multiplied and transmitted by first and second lever mechanisms 62 and 64 to act on a movable member 68, which retains a printing wire 66, as a couple of forces as indicated by dotted arrows D and C. Then, the wire 66 performs an impact stroke in a direction indicated by a dotted arrow E and, when the excitation voltage is interrupted, returns to its initial or nonimpact position.

Since an impact printing unit of the type described causes the wire 66 to reciprocate a significantly large number of times for a unit time, the excitation system in accordance with the present invention will offer a remarkable power saving effect when applied to such a unit. Furthermore, due to the use of the vertical piezoelectric effect type stack 10, the electromechanical coupling coefficient attainable with the present invention is larger than one attainable with a transverse piezoelectric effect type element, thereby reducing power for a given dimensional strain and making the construction small-size.

In summary, it will be seen that the present invention provides a drive circuit for a piezoelectric stack which prevents excessive charge or discharge current from flowing at the time of drive and, hence, consumes less power than the prior art drive circuit.

Various modifications will become possible for those skilled in the art after receiving the teachings of the present disclosure without departing from the scope thereof.

What is claimed is:

1. A drive circuit for piezoelectric stack, comprising:
   a piezoelectric stack connected to a reciprocating mechanical object and generating a dimensional strain in response to an excitation voltage appliec across electrodes of said piezoelectric stack to drive said object in a reciprocating motion;
   a winding connected in series with one of said electrodes of said piezoelectric stack;
   switch means for applying the excitation voltage to the piezoelectric stack via said winding in response to a drive signal which is representative of an application timing of the excitation voltage; and
   feedback means connected in parallel to the switch means for bypassing around the switch means any reverse polarity current which develops at the output of said switch means.

2. A drive circuit as claimed in claim 1, in which the winding has an inductance which is predetermined such that a charge stored in the piezoelectric stack becomes substantially zero at a recovery time of oscillation of the dimensional strain generated in the piezoelectric stack.

3. A drive circuit as claimed in claim 1, in which the drive signal comprises a pulse having a duration which is substantially equal to a recovery time period.

4. A drive circuit as claimed in claim 1, in which the switch means comprises a transistor switch for applying the excitation voltage to the piezoelectric stack in response to the drive signal.

5. A drive circuit as claimed in claim 1, in which the piezoelectric stack is constructed to generate the dimensional strain by a vertical piezoelectric stiffened in response to the excitation voltage.

6. A drive circuit as claimed in claim 1, in which the object to which the piezoelectric stack is connected is constructed to cause a printing wire to reciprocate by transmitting the dimensional strain to said printing wire after multiplying the strain.

7. A drive circuit for a piezoelectric stack, comprising:
   a piezoelectric stack connected to a reciprocating mechanical object and generating a dimensional strain in response to an excitation voltage applied across electrodes of said piezoelectric stack to drive said object in a reciprocating motion;
   a winding connected in series with one of said electrodes of said piezoelectric stack;
   first switch means for applying the excitation voltage to the piezoelectric stack via said winding in response to a drive signal which is representative of an application timing of the excitation voltage;
   first feedback means connected in parallel to the first switch means for bypassing around said first switch means any reverse polarity current which develops at the output of said first switch means;
   second switch means for dissipating a charge stored in the piezoelectric stack via the winding in response to a damp signal which is representative of a damping timing for the dimensional strain; and second feedback means connected in parallel to the second switch means for bypassing around said second switch means any reverse polarity current at the output of said second switch means.

8. A drive circuit as claimed in claim 7, in which the winding has an inductance which is predetermined such that a charge stored in the piezoelectric stack becomes substantially zero at a recovery time of oscillation of the dimensional strain which develops in the piezoelectric stack.

9. A drive circuit as claimed in claim 7, in which the drive signal comprises a pulse having a duration which is substantially equal to a recovery time period of oscillation of the dimensional strain which develops in the piezoelectric stack.

10. A drive circuit as claimed in claim 7, in which the first switch means comprises a first transistor switch for applying the excitation voltage to the piezoelectric stack in response to the drive signal.

11. A drive circuit as claimed in claim 7, in which the second switch means comprises a second transistor switch for dissipating the charge stored in the piezoelectric stack in response to the damp signal.

12. A drive circuit as claimed in claim 7, in which the second switch means has a resistor connected in series with the winding and is constructed such that the winding, the resistor and the piezoelectric element complete a serial closed path to damp the mechanical vibration of the piezoelectric stack when the damping timing is reached.

13. A drive circuit as claimed in claim 12, in which the resistor has a resistance which is predetermined to substantially satisfy a critical oscillation condition in the serial closed path.

14. A drive circuit as claimed in claim 7, in which one of the drive signal and the damp signal is produced by inverting high and low voltage levels of the other.

15. A drive circuit as claimed in claim 7, in which the piezoelectric stack generates the dimensional strain by a stiffened piezoelectric effect in response to the excitation voltage.

16. A drive circuit as claimed in claim 7, in which the object to which the piezoelectric stack is connected is constructed to cause a printing wire to reciprocate by transmitting the dimensional distortion to said printing wire after multiplying the strain.

17. A drive circuit as claimed in claim 1, in which the feedback means comprises a diode.

18. A drive circuit as claimed in claim 7, in which the first feedback means comprises a diode.

19. A drive circuit as claimed in claim 7, in which the second feedback means comprises a diode.

* * * * *